United States Patent [19]

Sanderson

[11] Patent Number: 5,467,082
[45] Date of Patent: Nov. 14, 1995

[54] PROXIMITY ACTUATOR AND READER FOR AN ELECTRONIC ACCESS SYSTEM

[76] Inventor: Glenn A. Sanderson, 2211 Alameda Padra Serra, Santa Barbara, Calif. 93103

[21] Appl. No.: 102,534

[22] Filed: Aug. 5, 1993

Related U.S. Application Data

[63] Continuation-in-part of Ser. No. 818,394, Jan. 2, 1992, abandoned, which is a continuation-in-part of Ser. No. 426,591, Oct. 25, 1989, abandoned.

[51] Int. Cl.⁶ .................................................. H04Q 9/00
[52] U.S. Cl. ............................ 340/825.54; 340/825.31; 340/825.34
[58] Field of Search .......................... 34/825.54, 825.31, 34/825.32, 825.34, 825.21, 572, 539; 235/382, 492; 455/41; 340/870.31, 870.32

[56] References Cited

U.S. PATENT DOCUMENTS

| | | | |
|---|---|---|---|
| 3,299,424 | 1/1967 | Vinding | 340/870.31 |
| 4,196,418 | 4/1980 | Kip et al. | 340/825.54 |
| 4,333,072 | 6/1982 | Beigel | 340/825.54 |
| 4,388,524 | 6/1983 | Walton | 340/825.31 |
| 4,510,495 | 4/1985 | Sigrimis et al. | 340/825.54 |
| 4,604,253 | 7/1986 | Kreft | 340/825.31 |

*Primary Examiner*—Donald J. Yusko
*Assistant Examiner*—Edwin C. Holloway, III
*Attorney, Agent, or Firm*—Michael G. Petit

[57] ABSTRACT

An identification token and reader circuit for an electronic identification and latch/alarm system, the token comprising an LC resonant circuit, a digital counter, an analog or digital demultiplexer and at least one analog switch. The token's supply voltage is derived from the token's resonant LC circuit by a rectifier means when the token is proximal to a suitable oscillator as found in a reader/controller. The device is useful for access control in an electronic lock and key system. When the token is brought near to the lock part, an oscillator contained within the lock part oscillates at a high frequency. The oscillation is picked up by the key part where it is modulated with a frequency or pulse pattern serving as a key identifier, then transmitted back to the lock part where the enclosed carrier is demodulated by means of synchronous detection and processed by recognition means at the lock side.

4 Claims, 2 Drawing Sheets

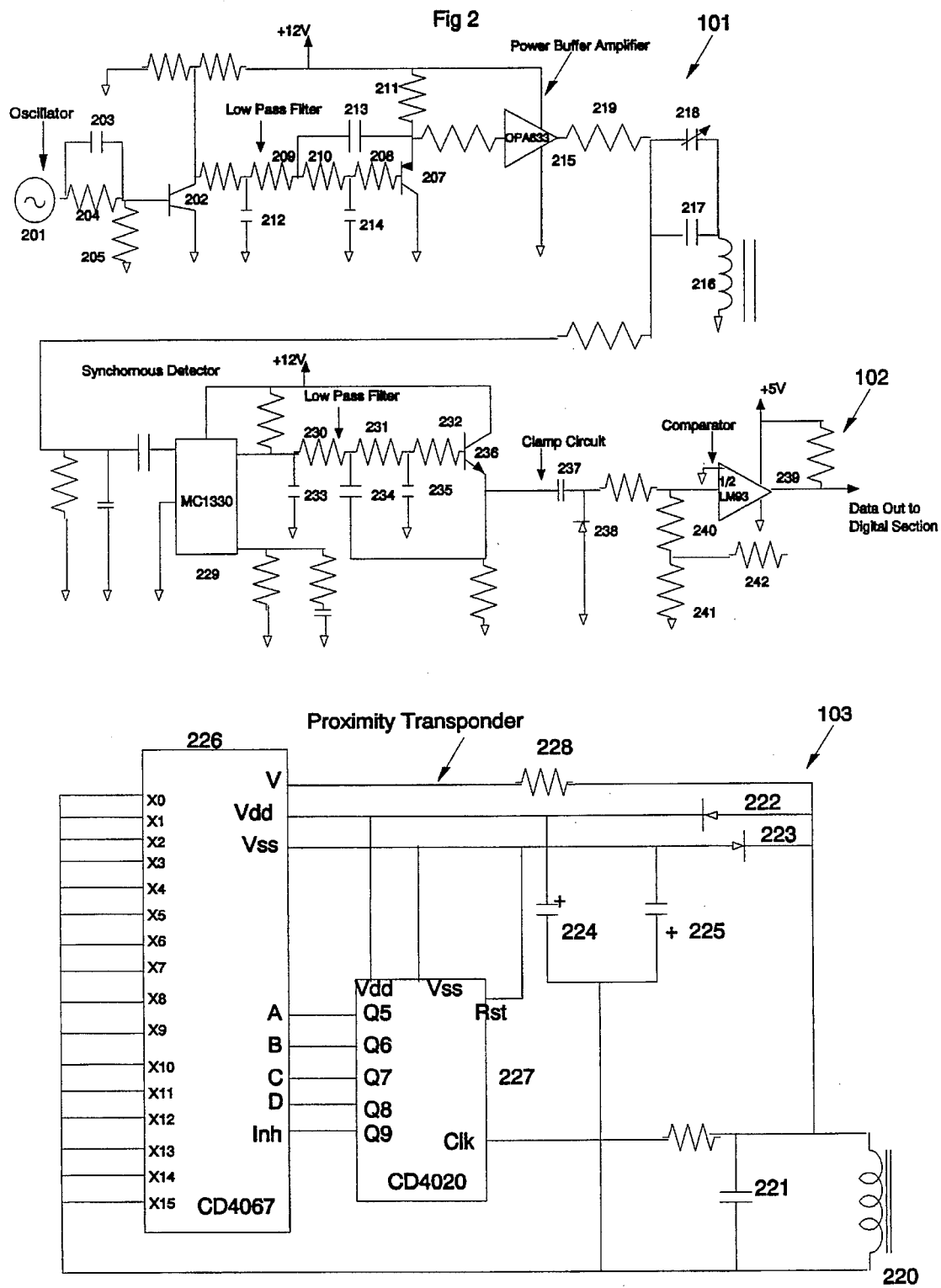

PROXIMITY ACTUATOR AND READER FOR AN ELECTRONIC ACCESS SYSTEM

RELATED APPLICATIONS

This application is a continuation in part of Ser. No. 07/818,394 filed Jan. 2, 1992 (now abandoned) which is a continuation in part of Ser. No. 07/426,591 filed Oct. 25, 1989 which is also abandoned.

BACKGROUND OF THE INVENTION

1. Field of the Invention

This invention relates to an identification token for use with an electronic identification/actuation system and more particularly, this invention relates to a positive identification system wherein a coded transponder is energized by radio frequency interrogation to produce a coded identification signal which identifies the person or object bearing the transponder to selectively control access to a restricted space.

2. Description of the Prior Art

It is known in the applicable art to employ identification systems that utilize a variety of identification means. Radio frequency means allow identification without the necessity of physical contact between the interrogator and the transponder, but such systems typically require the use of battery powered transponders or large antenna geometries to attain reasonable distances between the interrogator and transponder. Many of these systems employ complex interrogation schemes in order to attain the radio frequency power levels necessary to properly excite a passive, i.e. non battery powered transponder.

Electronic locking means are known in the art in which there is an interaction between the key part and the lock part. Such systems are already known and can be used, for example, in case certain locations in a building are accessible only to a predetermined class of persons. The persons carry an identification token comprising an electrical circuit which generates a signal in response to an electromagnetic field generated by an oscillator housed in or near the lock. Alternatively, the token may modify the strength of the oscillator's electromagnetic field which can be detected by suitable means.

In prior art recognition and identifier systems there are two directions or communications between the reader and the identifier devices. The reader (recognition station) which is typically stationary, sends an interrogation signal and/or power to the identifier device (e.g. a card, a tag, or a key) which is typically portable. In response the identifier device sends a coded signal bearing intelligence about its identification to the reader. Means must be provided so that the two directions of the communication in power do not interfere to the extent of inhibiting the desired transfers. One characteristic of these systems is that inductive coupling is often used between the reader and the identifier; another characteristic is that often both power and data are transmitted over the same inductively coupled coils and great care must be taken to prevent interference between the token and reader.

Walton, in U.S. Pat. No. 4,388,524, describes an electronic identification and recognition system in which the recognition portion includes a voltage controlled oscillator which sweeps over a range of frequencies. The token, or identification portion, resonates at certain frequencies determined by a variable reactance in the resonant circuit in the token which is responsive to bits from a sequential data register. The bits result in the on/off switching of the variable reactance which modifies the resonant frequency in the token or modifies the frequency of an oscillator in the token. The changes and sequence of changes in the resonant frequency are detected and recorded by the recognition portion such that the internal code of the token or identifier is determined.

Kreft, in U.S. Pat. No. 4,602,253, describes an apparatus for mutual information transmission between an electronic lock and key using paired antenna coils at both the key and lock. A periodic signal is emitted from the lock and is received by the key. Upon activation of the key electronics and emission of a coded information signal. This return signal received from the lock coil is briefly short-circuited or damped at the key side in order to produce a synchronization switch synchronizing the points in time of the signal appearance. Electronic converters are provided in the reader which, given the precondition that the short-circuited signal extends over a plurality of signal pulses, generate a digital signal corresponding to the short circuit times.

Kip et al, in U.S. Pat. No. 4,196,418, describes a detection plate or identification key for an identification system comprising a resonant circuit, a switching device, a coding means and a separate pulse generator fed by the resonant circuit, the output of the pulse generator being connected to the coding means. Kip et al's invention requires the presence of a separate pulse generator in the token circuit. It would be desirable to provide an identification token that did not require the presence of a separate pulse generator inside the token for regulating coding means. The Kip et al detection plate (or token) circuit includes a resonant circuit comprising a coil and capacitor in parallel; rectifier means and capacitors which form a supply circuit to provide a supply voltage when the resonant circuit is in oscillation; a digital counter which receives supply voltage from the supply circuit associated with the resonant circuit; two digital multiplex circuits having control encoding inputs connected to outputs of the counter and a switching device such as a transistor connected to the outputs of the multiplex circuits which is brought into conductive and nonconductive states by means of the code signal from the multiplex circuits. The switching device short-circuits the resonant circuit to form a coded signal. However, since the resonant circuit also supplies supply voltage for the circuitry of the detection plate, it cannot remain short-circuited for too long a time. A signal from the counter supplied to the coding inputs of the multiplex circuits insures that the resonant circuit is not short-circuited by the transistor for at least 50% of the time so that the energy transfer blocks are formed in resonant circuit signal.

In U.S. Pat. No. 4,510,495, issued to Sigrimis et al, an interrogator's power transmitter, using a loop antenna, transmits a plurality of radio frequency burst signals to power the transponder; the between-burst time periods are used so that the interrogator receiver section can "listen" to the transponder without being overloaded by the transmitter. The transponder, although powered remotely by the power transmitter, transmits a pulse-modulated carrier signal back to the receiver, which includes a preamplifier switching system to avoid receiver damage.

U.S. Pat. No. 4,333,072 to Beigel discloses a close-coupled identification system wherein a tag (passive transponder) is brought in close proximity to a probe circuit to verify identification. Beigel discloses a probe circuit which is loaded and unloaded by an identification device in a predetermined time sequence. This probe circuit uses a push-pull amplifier arrangement, along with an autotransformer coil, to generate an alternating magnetic field.

The foregoing systems require the use of fairly high energy to be transmitted to properly power the tag circuit or transponder. The elimination of the use of circuitry such as push-pull amplifiers and receiver input preamplifier switching is desirable from both cost and physical size standpoints. In addition, the simplification of the interrogation circuitry and improvement in the receiving circuitry sensitivity would result in advantages over the existing art.

Other miscellaneous identification tokens having integral power supplies such as a battery are well known in the literature. For example, Battry in U.S. Pat. No. 4,353,064, describes a battery-operated access control card. The card receives a code from the reader. It checks the code to see if it matches its memory. If so, it transmits a second code. The card has no LC circuit.

SUMMARY OF THE INVENTION

The invention relates to a proximity key (also referred to herein as a token or transponder) useful in a system operable for either alarm control or access control. Such systems normally includes a reader/controller mounted to a wall and interfaced with a burglar alarm in the alarm control application or a door latch in the access control application, and one or more tokens carried by persons desiring access through the door or control of the alarm system. Operation of the system involves sweeping the token close to the reader/controller. A specific code is associated with each token and receipt of the code by the reader/controller actuates a relay.

The present invention overcomes the problems of the prior art in teaching the construction and use of an identification system wherein a proximity interrogator generates an alternating magnetic field that is pertubated, or alternately loaded and unloaded, by a proximity token or, alternatively, a transponder, that is brought near the interrogator's resonant coil. The field pertubation is accomplished by the transponder at a rate subharmonic to the original alternating field while the transponder or token is powered by the interrogating field. This field pertubation is detected as low-level amplitude modulation by a synchronous detector, clamped at its most-negative voltage, and re-shaped into digital data.

The reader controller of the system includes an oscillator circuit, a resonant circuit, a demodulator, and a controller (microprocessor). The oscillator circuit provides a clock frequency to the resonant circuit and to the controller. The resonant circuit is the source of power for a complementary resonant circuit in the token when the token is brought into close proximity to the resonant circuit of the reader/controller. The demodulator is provided for processing code data received back from the token circuit and outputting the same to the controller. The controller processes code data transmitted back from the token by comparing the code data with all of the codes in its memory to determine if there is a "match." A "match" allows the controller to close a relay which operates a door latch for a preset time in the access control application or to toggle a latching relay to arm or disarm the alarm system in the alarm control application.

The token has a resonant circuit complementary to that of the reader/controller, a digital counter, an analog or digital demultiplexer, and analog switches bridging the token resonant circuit. When the token is brought close to the reader/controller, its resonant circuit draws power from the resonant circuit of the reader/controller. This power is used for three purposes: 1) to power the above circuitry in the token; 2) to provide a clocking signal for operating the digital counter and other components associated therewith in the token circuitry to generate the code data assigned to the token; and 3) to modulate the clocking signal in accordance with the code data generated for transmitting the code data back to the reader/controller's resonant circuit. The transmitting of the code data and the powering of the token circuit are enabled at different times.

BRIEF DESCRIPTION OF THE DRAWINGS

FIG. 2 is an electrical circuit schematic diagram of the apparatus of the preferred embodiment of the invention.

DESCRIPTION OF THE PREFERRED EMBODIMENT

Figure 1:
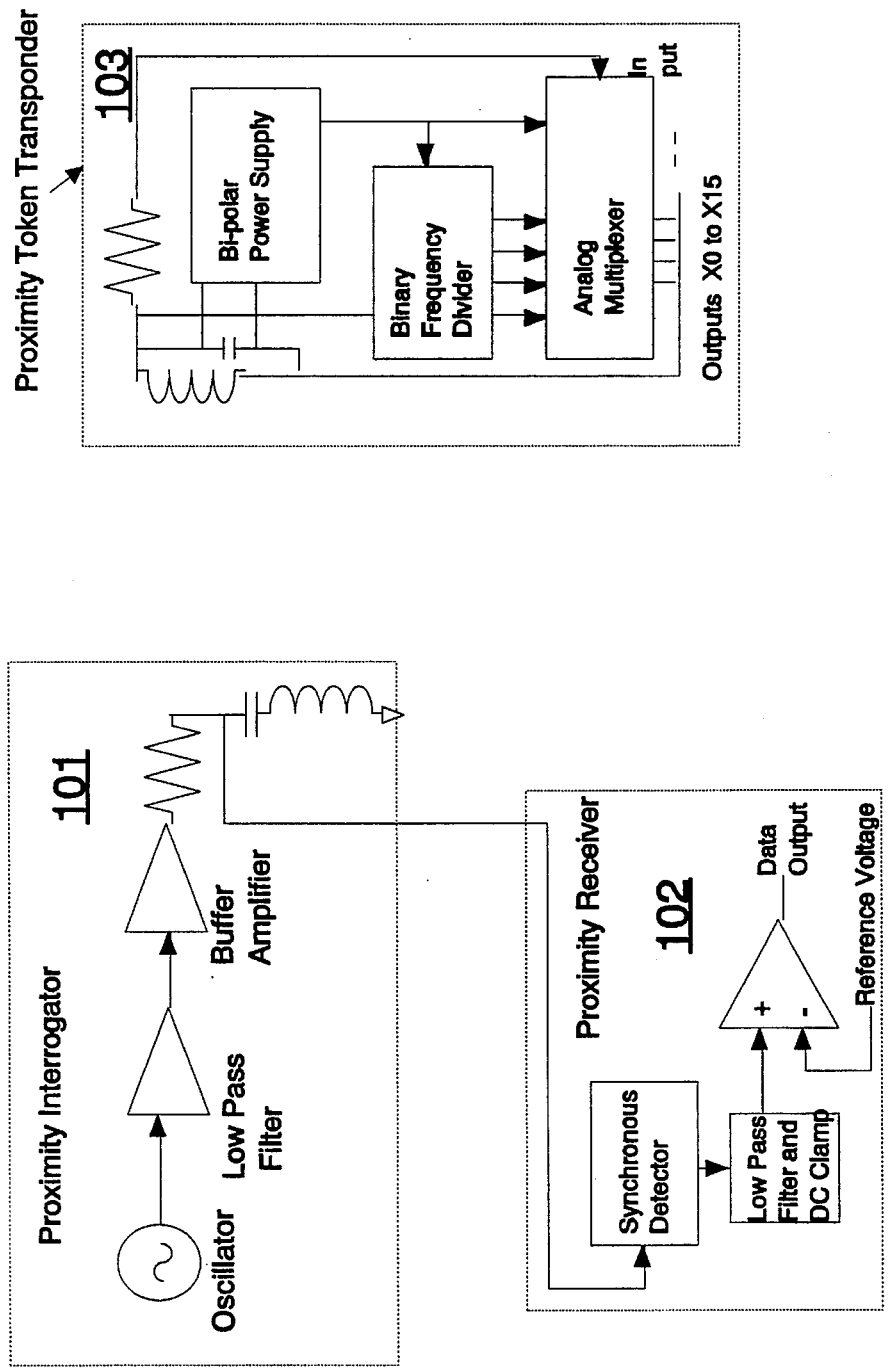
FIG. 1 is a general block diagram of the apparatus of the preferred embodiment of the invention.

The token of the instant invention is for use as part of a token-reader/controller system such as is well known in the prior art. The reader/controller is normally stationary, mounted to a wall or other similar object. The tokens are small, carried on a person's key ring or loose, or could be attached to a variety of objects. Most readers (card, proximity, etc.) all take data, look up a code, and grant or deny access. However, the pairing of synchronous modulation (at a subharmonic rate) in the token described herein allows the use of a synchronous detector to demodulate the low-level modulation on the carrier at the first resonant circuit in the reader. Other types of demodulation, such as diode detection, would either not work if done simply, or would require more parts. Some prior art token/reader systems use two sets of coils, usually non-resonant, to avoid having to reject large amounts of carrier. Synchronous detection obviates this problem.

In general, the reader/controller consists of an oscillator circuit operating in the 300 kilohertz to 500 kilohertz range, which feeds a resonant circuit consisting of a capacitor and an inductor coil. The oscillator either provides the clock frequency or is supplied with its frequency by the controller via a microprocessor clock sub-harmonic. The resonant circuit signal is demodulated by a synchronous detector able to detect low-level amplitude modulation. The synchronous detector determines the instantaneous absolute value of the amplitude of the alternating current carrier and produces an output signal with two main components. One is a direct current component which is proportional to the average level of the carrier; and the other is an alternating current component which follows the data amplitude modulation envelope. This signal is low pass filtered via a data filter to remove the vestiges of the carrier, or alternating current. The signal is then passed through a direct current restorer or clamp circuit which performs two main functions: first, it removes the average carrier direct current component; and second, it establishes a fixed reference for the most negative portion of the data modulation envelope irrespective of either the duty cycle of the modulating signal, the distance between the two coils, or modulation depth. This signal is then fed to a simple direct current voltage comparator to process the data into voltage logic levels. Thus, the device allows the data to be precisely demodulated with no concern for modulation duty cycle, coil coupling distance or modulation depth, as long as there is sufficient modulation measured on the reader coil for proper operation of the synchronous detector.

The preferred embodiment of the invention consists of two major components: (a) a combination proximity interrogator and receiver; and (b) a coded token, or transponder. Referring to the drawings, FIG. 1 is a general block diagram showing the general relationship between the interrogator 101, the receiver 102 and transponder 103 and FIG. 2 is an electrical circuit schematic diagram which illustrates in detail the blocks of FIG. 1. Referring now to FIG. 2, in the proximity interrogator 101 a 409 KHz square wave carrier signal generated by a crystal-controlled oscillator 201 is sent to a transistor buffer amplifier 202. A capacitor 203 and two resistors 204, 205 compose an attenuator to reduce the drive level to that appropriate for the amplifier 206. The square wave signal from the collector of the amplifier 206 is passed through an active low pass filter (transistor 207, resistors 208, 209, 210, 211, and capacitors 212, 213, 214) to attenuate its harmonics, producing a clean sine wave carrier output at the emitter of transistor 207. This signal is then passed on to a power buffer amplifier 215 to increase the current (power) drive capability of the carrier signal. This signal is then fed to a series resonant inductor-capacitor (LC) circuit (inductor 216, capacitor 217 and tuning capacitor 218) to resonate at the carrier frequency. Inductor 216 produces a strong AC magnetic field in its proximity. Resistor 219 (between the power buffer amplifier 215 and the series resonant circuit 216, 217) is used to sense the energy drawn from this circuit for use in the proximity receiver 102 circuitry.

In the proximity token/transponder 103, a parallel resonant circuit (inductor 220, capacitor 221) produces an AC voltage output when immersed in an AC magnetic field whose frequency matches that of the resonance frequency of the parallel resonant circuit (inductor 220, capacitor 221). This AC voltage is then rectified by diodes 222, 223 and stored by capacitors 224 and 225 to produce the bipolar DC voltage necessary to power the digital CMOS Integrated Circuits 226 (CD4067 or equivalent) and 227 (CD4020 or equivalent). An AC signal from the resonant circuit (inductor 220, capacitor 221) is fed into the clock input of binary frequency divider 227. This IC produces several outputs whose frequencies are successively ½ the rate of the prior output. The outputs of divider 227 then drive the address inputs of analog multiplexer 226. Divider 227 output Q9 operates at the slowest output frequency output (half of the slowest data rate) and is input to the "inhibit" input of the analog multiplexer 226, suppressing the loading by the analog multiplexer 226/resistor 228 combination to allow a minimum of 50% of the time to be used for supplying power for the divider 227 and multiplexer 226. Multiplexer 226 loads or unloads the parallel resonant circuit (inductor 220, capacitor 221) by switching resistor 228 across the parallel resonant circuit at a sub-harmonic rate of the carrier frequency, typically 1/16th. The resistive value of resistor 228 is selected to optimize the distance at which the token 103 may be powered and transmit data. Information, i.e. digital data, is imposed by programming (completing or breaking the circuit) multiplexer 226 output lines X0 through X15 with a unique pattern (code) for each token. In practice, this is done during printed circuit board fabrication, and output X0 is left connected to provide a "start of code" bit.

This is one embodiment of the transponder, but by no means the only one. For example, a FET (field-effect transistor) switch (not shown) could provide the switching capability, while being driven by an off-the-shelf digital counter and sequencer, or even a custom or semi-custom application-specific integrated circuit (ASIC). The transponder coil 220 may be constructed of turns of wire around the perimeter of a card, traces on a printed circuit board, or other means.

In the proximity receiver 102, the voltage drop across resistor 219 between the transmitter power buffer amplifier 215 and its series resonant circuit (inductor 216, capacitor 217) is affected by the loading of the field around inductor 216. The small voltage pertubations across resistor 219 caused by the proximity token 103 modulating the field are amplified and rectified by the synchronous detector 229, which is a Motorola MC1330. Although the present embodiment shows a commercially available synchronous detector used, a custom-designed synchronous detector could be used in its place, using readily available discrete components (or custom circuitry in an application-specific integrated circuit) in a design configuration known to one of ordinary skill in the art.

The output of the synchronous detector 229 is fed to an active low pass filter, consisting of resistors 230, 231, 232, capacitors 233, 234 and 235 and transistor 236 to separate the carrier from the data. The DC component of the carrier, which would otherwise vary according to the modulation duty cycle, is removed by the clamp circuit, also called a direct current restorer, consisting of capacitor 237 and diode 238, which also brings the most-negative portion of the data signal down to below 0.6 volts. The remaining analog data signal is fed to an LM393 voltage comparator 239, which is which acts as a one-bit analog to digital converter to convert the analog signal to a bi-level signal, or digital data stream. The comparator 239 compares the analog data input from the clamp circuit with a fixed voltage, which is set by resistors 240, 241 and 242.

Voltage comparator 239 outputs approximately 5 volts DC (data output high, or "0") when there is no analog data input to it. A loading of the field near inductor 216 causes a DC level shift at the output of synchronous demodulator 230, but the shift is removed by the clamp circuit consisting of capacitor 237 and diode 238 and therefore is not output by comparator 239. A field pertubation at the analog data rate is seen as an alternating current (AC) signal, which causes a series of level shifts at the input of comparator 239. Since these level shifts are above and below the comparison voltage, excursions below the comparison voltage cause the comparator output to go low, outputting a digital data "1". The digital data output by the comparator 239 is a data stream, or series of high/low shifts.

The data from the receiver circuit 102 is then fed, for example, to a microcontroller, which is an off-the-shelf model. This microcontroller and associated circuitry compares the 16-bit data word with those data words previously stored in non-volatile memory.

Turning now to FIG. 3, a preferred embodiment of the token circuit is indicated at numeral 30. The output selector 31 is a Motorola MC14067B or equivalent. The digital divider 32 is a Motorola MC14020B or equivalent. The load resistor R1 is 1800 OHMS ±10%, 1.8 watt. R2 is 1000 OHMS ±10%, ⅛ watt. The power supply 34 components are 1N34A diodes D1 and D2, and 1.5 microfarad ±20% tantalum capacitors C2 and C3. The resonant circuit 33 consists of C1, a 1000 picofarad ±1% NPO capacitor; and L1, a 150 microhenry ±2% inductor. The novel token described herein when used with the described reader and a controller provides a stable inexpensive means for coded proximity control of an access or alarm system. The essential point is that this token design obviates the need for an oscillator to generate a coding signal. In addition, the use of a harmonic carrier permits the use of synchronous detection to demodulate data superimposed on carrier whereas a non-harmonic carrier would not allow synchronous detection. These features combine to give better signal recovery, lower parts count and lower cost than currently available systems.

One embodiment of the interrogator/receiver has been described, but other embodiments could include means for displaying the actual data word or token identification code, such as a numeric LED display, or means for processing and formatting the data and sending it on to a host computer for further decision making. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. An electronic access system comprising: (a) a key portion, said key portion consisting of an identification token comprising, in combination a parallel resonant circuit and a switching device with a resistor in series therewith, said switching device and resistor combination being connected in parallel with said parallel resonant circuit, said switching device and resistor combination either loading or unloading said parallel resonant circuit, and a coding means controlling said switching device wherein said coding means further comprises a digital circuit containing at least one preselected code, said token receiving, in operation, its supply voltage from said resonant circuit by rectifier means thereon and an input signal from said resonant circuit which input signal is processed by said coding means to provide an output signal, said output signal carrying said at least one preselected code, said output signal being fed to said switching device for effecting the loading or coupling of said resonant circuit; and (b) a lock portion, said lock portion comprising a reader data detection circuit, said reader data detection circuit comprising a resonant circuit and a synchronous detector, said resonant circuit receiving a driver signal from a sine wave carrier source and said resonant circuit providing a reader input signal to said synchronous detector, said synchronous detector including means for forming an instantaneous value signal representing the instantaneous absolute value of the amplitude of said reader input signal, and means for comparing said instantaneous value signal to a fixed reference voltage to recover said at least one preselected code.

2. The electronic access system of claim 1, wherein said means for comparing said instantaneous value signal to said fixed reference voltage includes filter means for receiving said instantaneous value signal and removing any carrier component therefrom.

3. The electronic access system of claim 2 wherein said means for comparing said instantaneous value signal to said fixed reference voltage further includes clamp means for clamping the filtered instantaneous value signal to said fixed voltage reference.

4. The electronic system of claim 3, further including logic means for receiving the clamped, filtered instantaneous value signal and recovering said preselected code.

\* \* \* \* \*